(12) United States Patent
Emelyanov

(10) Patent No.: US 10,360,187 B1
(45) Date of Patent: Jul. 23, 2019

(54) HYBRID STORAGE FOR VIRTUAL MACHINES AND CONTAINERS

(71) Applicant: Parallels IP Holdings GmbH, Schaffhausen (CH)

(72) Inventor: Pavel Emelyanov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 303 days.

(21) Appl. No.: 15/062,070

(22) Filed: Mar. 5, 2016

(51) Int. Cl.
*G06F 16/188* (2019.01)
*G06F 3/06* (2006.01)
*G06F 9/455* (2018.01)

(52) U.S. Cl.
CPC .......... *G06F 16/188* (2019.01); *G06F 3/0604* (2013.01); *G06F 3/0629* (2013.01); *G06F 3/0664* (2013.01); *G06F 3/0674* (2013.01); *G06F 9/45558* (2013.01); *G06F 2009/45583* (2013.01)

(58) Field of Classification Search
USPC ........................................................ 707/823
See application file for complete search history.

(56) References Cited

U.S. PATENT DOCUMENTS

| | | | | |
|---|---|---|---|---|
| 9,256,467 | B1 * | 2/2016 | Singh | G06F 9/5055 |
| 9,294,524 | B2 * | 3/2016 | Raman | H04L 65/403 |
| 2015/0120928 | A1 * | 4/2015 | Gummaraju | H04L 67/1008 709/226 |
| 2015/0234670 | A1 * | 8/2015 | Shimogawa | G06F 9/45533 718/1 |
| 2015/0254364 | A1 * | 9/2015 | Piduri | G06F 16/188 715/234 |
| 2016/0292053 | A1 * | 10/2016 | Antony | G06F 11/203 |
| 2016/0359955 | A1 * | 12/2016 | Gill | H04L 67/1097 |
| 2016/0378519 | A1 * | 12/2016 | Gaurav | G06F 9/5077 718/1 |
| 2017/0134507 | A1 * | 5/2017 | Nayak | H04L 67/16 |
| 2017/0177860 | A1 * | 6/2017 | Suarez | G06F 21/31 |

* cited by examiner

*Primary Examiner* — Mohsen Almani
(74) *Attorney, Agent, or Firm* — Bardmesser Law Group

(57) ABSTRACT

A hybrid storage capable of storing the image files and the service files for VMs and Containers is provided. A large files storage is placed onto a service volume. A VM image file is placed onto the large file storage and a file system is mounted on it. The small files storage is also placed onto the service volume. This way a portion of the large file storage can be seen to the management system for VMs and Containers as a part of an interface of the common file system. Thus, large files and small files reside on the same distributed storage. One file from the large file storage is dedicated as a service file. The file system is placed into this file, which is mounted into the system as a virtual disk. The small (service) files are stored on the virtual disk. This way all files are accessible by the management system for VMs and Containers.

8 Claims, 3 Drawing Sheets

HYBRID STORAGE FOR VIRTUAL MACHINES AND CONTAINERS

BACKGROUND OF THE INVENTION

Field of the Invention

This invention relates to a method for data storage, and in particular, to implementing a hybrid storage for Virtual Machines (VMs) and Containers.

Description of the Related Art

A modern trend of virtualization presents some challenges with regard to isolation and storage of Virtual Machines' (VMs') and Containers' data. In conventional systems, as shown in FIG. 1, Containers 120 store data in their own file system 125. The VMs store data on the image file 130, which is converted into a virtual disk 115. However, the image file 130 cannot be stored on a common file system 140, because the common file system is not designed to support the loads created by the use of the image file 130. Thus, the common file system 140 would be very slow. In order to speed up the data processing, the image file is placed onto a special large file storage 150, which is optimized for very large files that have their attributes (i.e., metadata) change very rarely, while the file data content experiences frequent and massive changes. The large file storage 150 can be implemented as CEPH (rbd*), ZFS (zuol), PStorage*, thin DM, etc.

However, the management system for VMs and Containers cannot only store the large image files 130. It also has to store a lot of small service files 135, such as configuration files, logs, locks, states, etc. The volume of these files is significantly smaller than the volume of the image files, but a number of the files 135 are much larger than the number of the image files 130. However, the large files storage 150 is not optimized for storing a lot of small files 135, which have to be stored on a small files storage 155. Conventional file storages are not designed for storing large and small files at the same time. They work very slowly if both types of files are stored on the same storage. However, having VM and Container files located on different storages is inefficient in terms of data access by the management system. The large files storage 150 is distributed, while the small file storage 155 is not distributed. Thus, moving of the VMs and Containers can be problematic. The management system for VMs and Containers needs to have the large data files and small configuration files stored on the same distributed storage for efficient data access.

Accordingly, a system for implementing a distributed hybrid storage for VMs and Containers capable of storing large (image) files and small service files is desired.

SUMMARY OF THE INVENTION

Accordingly, the present invention is directed to a method and system for hybrid data storage, and in particular, to implementing hybrid storage capable of storing the image files and the service files for Virtual Machines (VMs) and Containers that substantially obviates one or more of the disadvantages of the related art.

In one aspect of the invention, a hybrid storage capable of storing the image files and the service files for VMs and Containers is provided. A large file storage is placed onto a service volume. A VM image file is placed onto the large file storage and a file system is mounted on it. The small files storage is also placed onto the service volume. This way a portion of the large file storage can be seen to the management system for VMs and Containers as a part of an interface of the common file system. Thus, large files and small files reside on the same storage. One file from the large file storage is dedicated as a service file. The file system is placed into this file, which is mounted into the system as a virtual disk. The small (service) files are stored on the virtual disk. This way all files are accessible by the management system for VMs and Containers.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
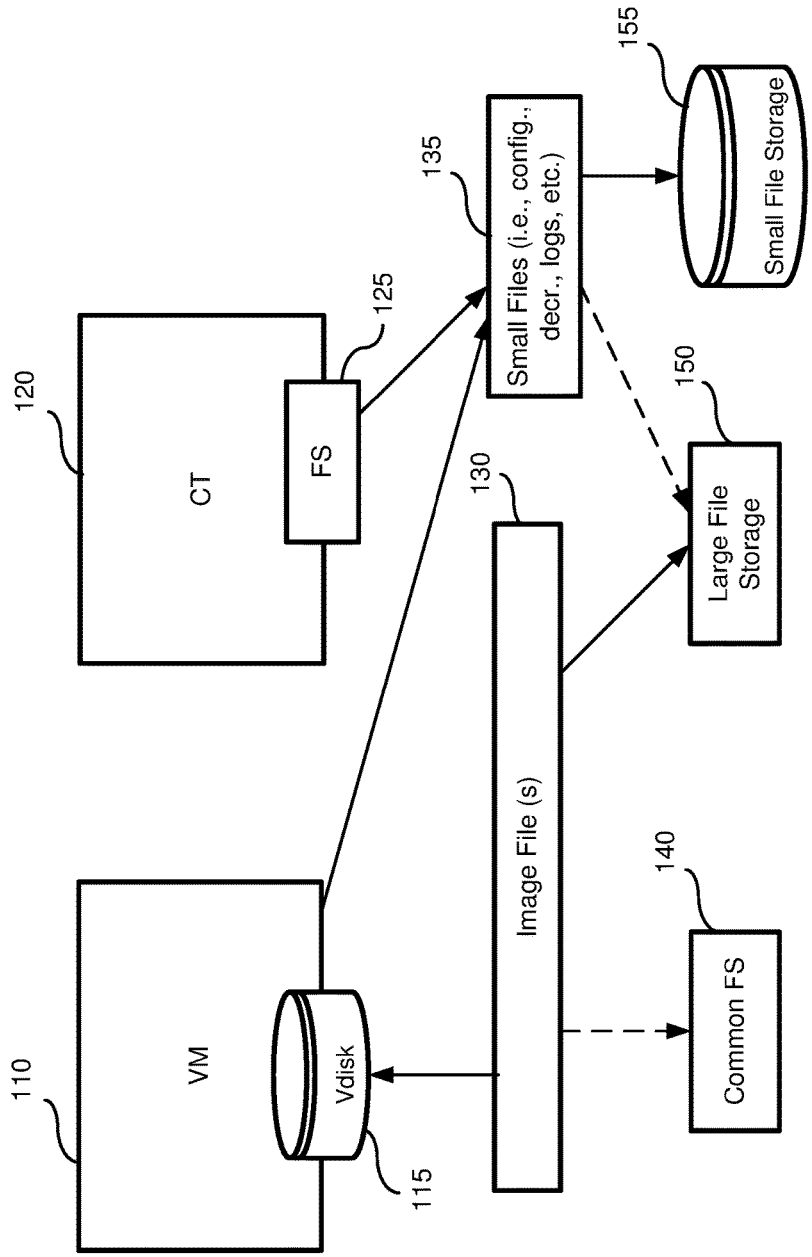
FIG. 1 illustrates a conventional system for separate storage of virtual disk image files and service files for VMs and Containers.

Reference will now be made in detail to the preferred embodiments of the present invention, examples of which are illustrated in the accompanying drawings.

The following definitions are used throughout the description.

VEE—Virtual Execution Environment, a type of environment that supports program code execution, where at least a part of the real hardware and software required for running program code are presented as their virtual analogs. From the point of view of the user, the code in VEE runs as if it were running on the real computing system.

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Virtual Private Server (VPS), is one type of a Virtual Execution Environment (VEE) running on the same hardware system with a single shared OS kernel and sharing most of the system resources, where isolation of Virtual Execution Environments is implemented on a namespace level. A Virtual Private Server (VPS), often referred to as a "Container," is a closed set, or collection, of processes, system resources, users, groups of users, objects and data structures. Each VPS has its own ID, or some other identifier, that distinguishes it from other VPSs. A container acts as an isolated virtual server within a single machine, where multiple sets of application services are organized on a single hardware node by placing each into an isolated virtual Container.

The VPS/Container offers to its users a service that is functionally substantially equivalent to a standalone server with a remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and web servers, etc. In other words, the full range of system administrator functions is desirable, as if the VPS were a dedicated remote server, with the existence of the VPS being transparent from the perspective of both the VPS user and the VPS administrator.

In one aspect of the invention, large file storage is placed onto a service volume. A VM image file is placed onto the large file storage and a file system is mounted on it. The small files storage is also placed onto the service volume. This way a portion of the large file storage as a part of an interface of the common file system can be seen to the management system for VMs and Containers. Thus, large files and small files reside on the same storage. A standard file system can be used. One file from the large file storage is dedicated as a service file. The file system is placed into this file, which is mounted into the system as a virtual disk. The small files are stored on the virtual disk. This way all files are accessible by the management system for VMs and Containers. The disk can be mounted on the host for launching a Container using ploop (i.e., PARALLELS loop, or a regular LINUX loop, or a natural block device). In case of the VMs, the disk image is provided to a hypervisor for launching a VM.

Figure 2:
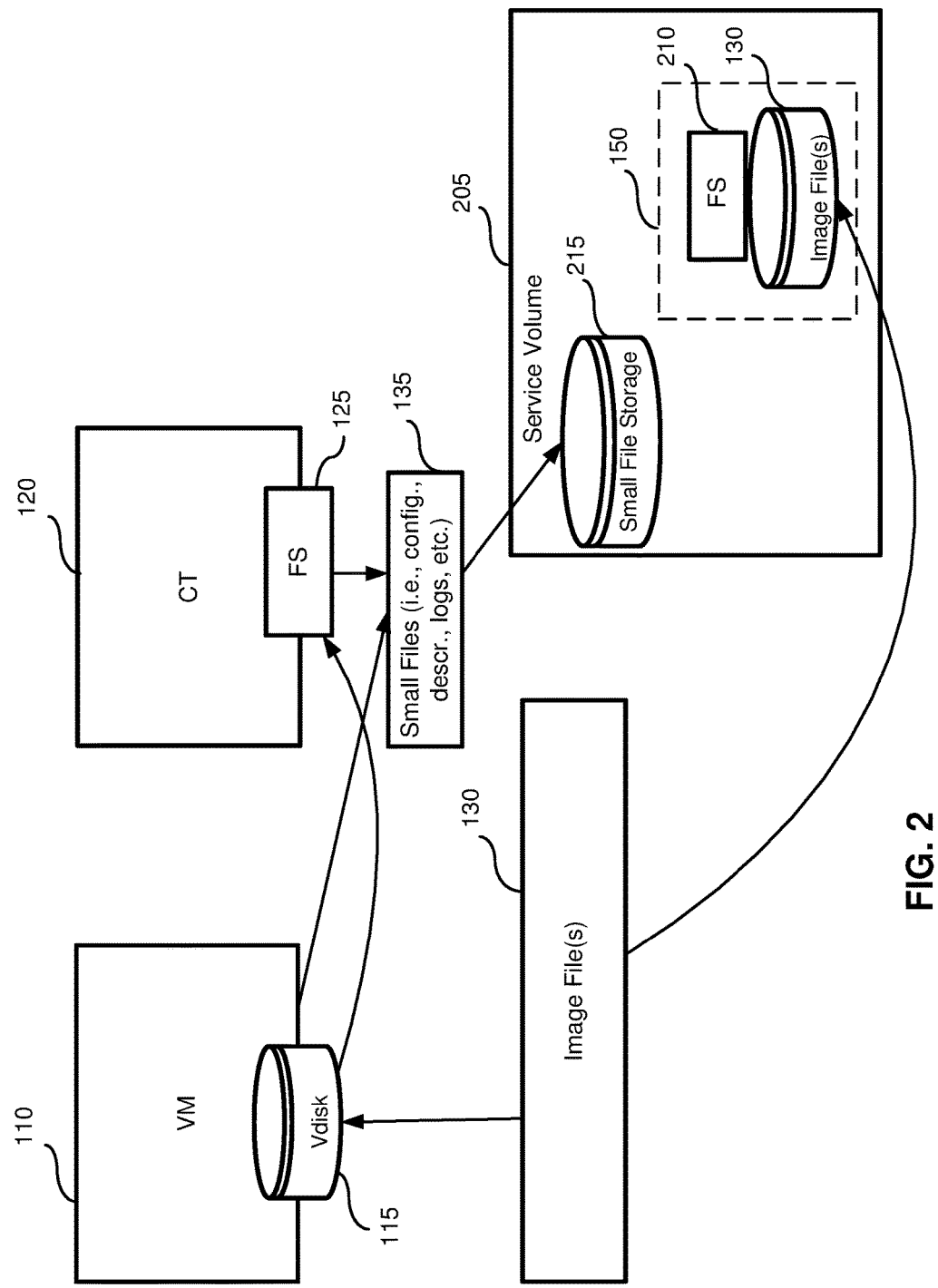
FIG. 2 illustrates a system for implementing a hybrid storage optimized for storing files for VMs and Containers, in accordance with the exemplary embodiment.

FIG. 2 illustrates a system for implementing a hybrid storage optimized for storing files for VMs and Containers, in accordance with the exemplary embodiment.

Containers 120 store data in their own file system 125. The VMs store data on the image file 130, which is converted into a virtual disk 115. The image file is placed onto a special large file storage 150, which is optimized for very large files that have their attributes (i.e., metadata) change very rarely, while the file data content experiences frequent and massive changes. The large file storage 150 can be implemented as CEPH (rbd*), ZFS (zuol), PStorage*, thin DM, etc.

The management system for VMs and Containers has to store a lot of small service files 135, such as configuration files, logs, locks, states, etc. According to an exemplary embodiment, a large files storage 150 is placed onto a service volume 205. A VM image file 130 is placed onto the large file storage 150 and a file system 210 is mounted on it. Any file system can be used. The component which creates the hybrid storage also creates the service volume 205 and places the file system 210 for storing configuration files. The small files storage 135 is also placed onto the service volume 205. This way a portion of the large file storage 150 can be seen to the management system for VMs and Containers as a part of an interface of the common file system 210.

This way, large files and small files reside on the same distributed storage—i.e., the service volume 205. A standard file system (e.g., EXT4) can be used. One file from the large file storage is dedicated as a service file. The file system is placed into this file, which is mounted into the system as a virtual disk 215. Then, the small files are stored on the virtual disk 215. This way all files are accessible by the management system for VMs and Containers (CTs). A special API library is created for providing an interface for mounting storages for small files and creation of service volumes. When the manager application launches a VM or a CT, it needs a special API (library) for using the configuration files used for launching the VMs/CTs. A hierarchical file system, such as BTRFS can be used with this interface for the Containers. In one embodiment, a node administrator can have all the rights for managing the hybrid storage. According to the exemplary embodiment, the image files can be encrypted. The encryption keys are stored on the CT hoster. However, the hoster data is protected in case of a physical data storage being stolen.

Figure 3:
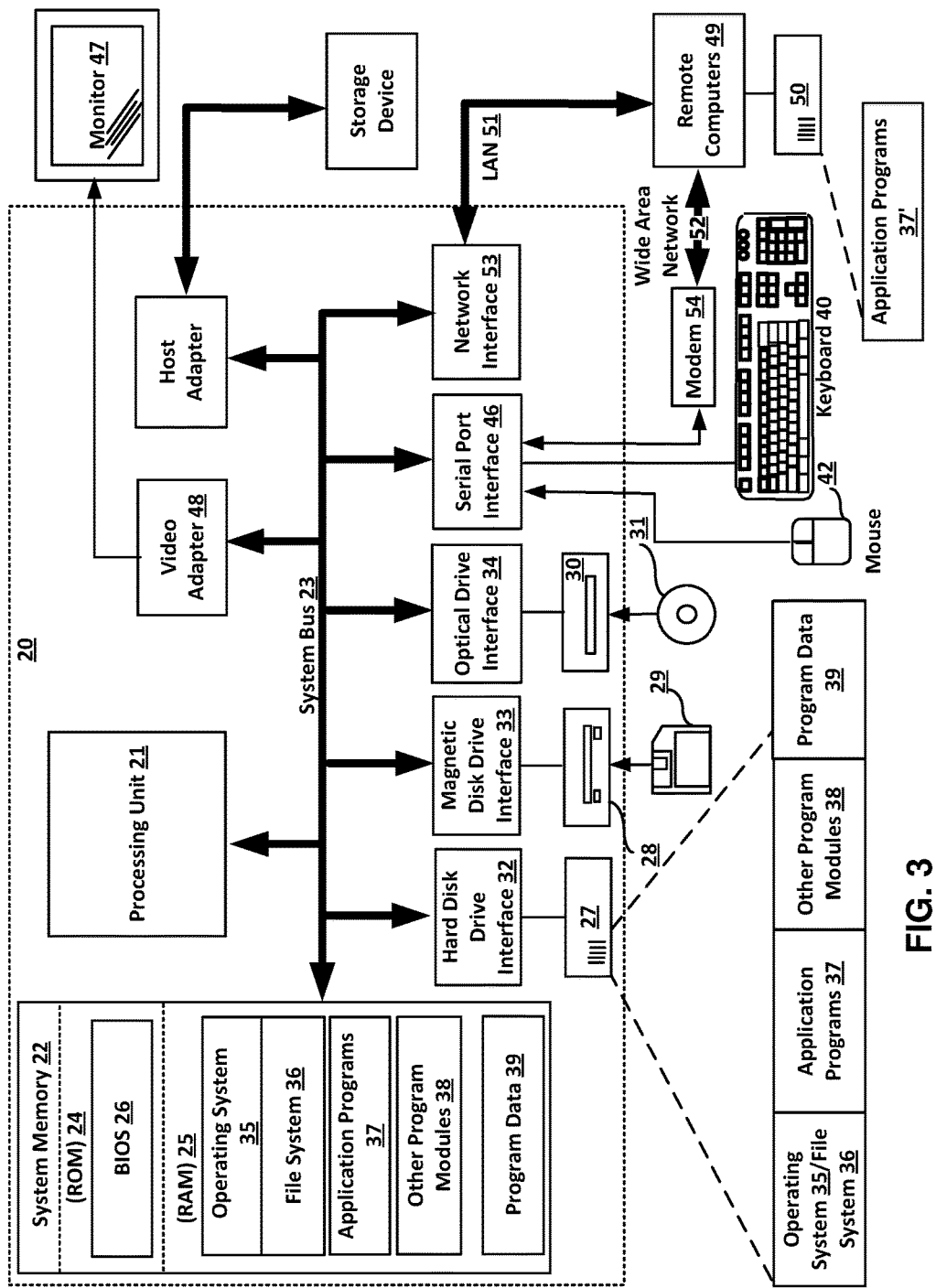
FIG. 3 illustrates a schematic of an exemplary computer system that can be used for implementation of the invention.

With reference to FIG. 3, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved.

It should also be appreciated that various modifications, adaptations, and alternative embodiments thereof may be made within the scope and spirit of the present invention. The invention is further defined by the following claims.

What is claimed is:

1. A computer-implemented method for creating a hybrid storage for storing data for Virtual Machines (VMs) and Containers, the method comprising:
    launching a VM and a plurality of Containers on a host, wherein the Containers share a host operating system (OS) and files of the Containers are stored in a file system of the host OS, and wherein the VM and the plurality of Containers are under supervision of a management system;
    storing a file system of the VM on a first virtual disk;
    storing a file system of the Container on a second virtual disk;
    mounting the second virtual disk with the file system of the Container on a host file system;
    storing service files of the VM and service files of the Container in a service virtual disk;
    instantiating a distributed image file storage accessible to the management system;
    storing the first, second and third virtual disks as image files in the distributed image file storage,
    wherein the third virtual disk is formatted as a service volume that is only accessible to the management system.

2. The method of claim 1, further comprising distributing the service volume.

3. The method of claim 1, further comprising encrypting the image file.

4. The method of claim 1, wherein the service files are any of:
    configuration files;
    logs;
    locks, and
    states.

5. A computer-implemented system for creating a hybrid storage for storing data for Virtual Machines (VMs) and Containers, the system comprising:
    on a computer having a processor and a host operating system, a VM and a plurality of Containers executing under the host operating system, wherein the VM and the Containers share a host operating system (OS) and files of the Containers are stored in a host file system, and wherein the VM and the plurality of Containers are under supervision of a management system;
    a file system of the VM stored on a first virtual disk;
    file systems of the Containers stored on a second virtual disk;
    the second virtual disk with the file system of the Containers being mounted on the host file system;
    service files of the VM and service files of the Containers being stored in a service virtual disk;
    a distributed image file storage accessible to the management system;
    the first, second and third virtual disks being stored as image files in the distributed image file storage,
    wherein the third virtual disk is formatted as a service volume that is only accessible to the management system.

6. The system of claim 5, further comprising distributing the service volume.

7. The system of claim 5, further comprising encrypting the image file.

8. The system of claim 5, wherein the service files are any of:
    configuration files;
    logs;
    locks, and
    states.

* * * * *